J. M. BUTCHER.
MOUNTING FOR BURGLAR ALARMS.
APPLICATION FILED SEPT. 18, 1919.
1,387,966.
Patented Aug. 16, 1921.
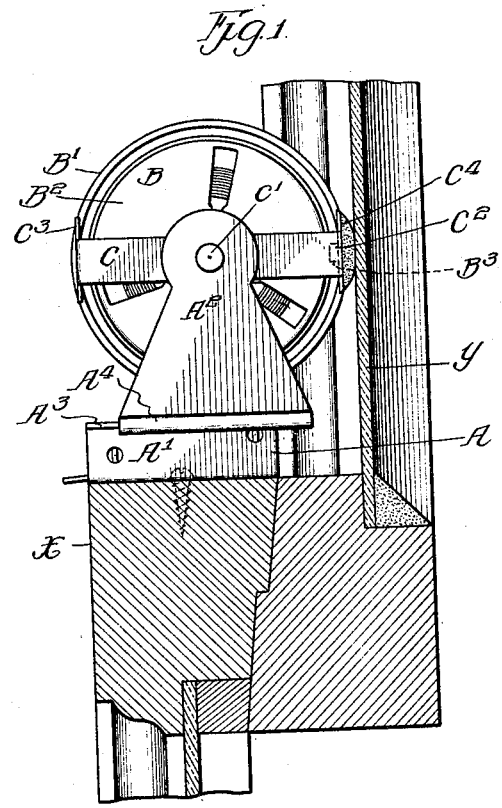
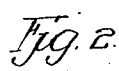
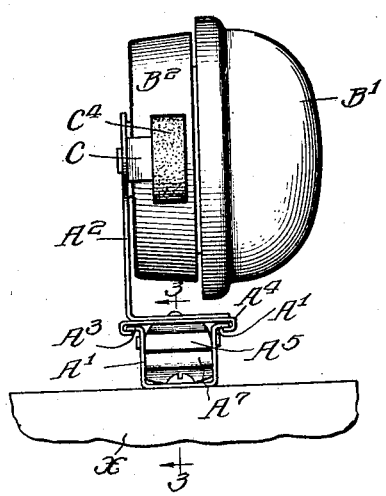
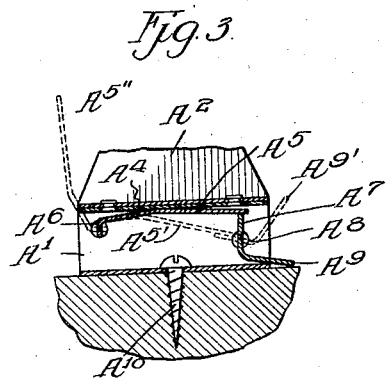
Witness:
R. Burkhardt.
Inventor:
James M. Butcher.
By Wilkinson & Hurley
Attys.

UNITED STATES PATENT OFFICE.

JAMES M. BUTCHER, OF CHICAGO, ILLINOIS, ASSIGNOR TO SENTINEL ALARM CO., OF CHICAGO, ILLINOIS, A CORPORATION OF ILLINOIS.

MOUNTING FOR BURGLAR-ALARM.

1,387,966.

Specification of Letters Patent. Patented Aug. 16, 1921.

Original application filed October 12, 1918, Serial No. 257,751. Divided and this application filed September 18, 1919. Serial No. 324,727.

*To all whom it may concern:*

Be it known that I, JAMES M. BUTCHER, a citizen of the United States, residing at Chicago, in the county of Cook and State of Illinois, have invented certain new and useful Improvements in Mountings for Burglar-Alarms, of which the following is a specification.

This is a division of my application filed October 12th, 1918, Serial No. 257,751.

In my application Serial No. 180,065, filed July 12th, 1917, I have described and broadly claimed an alarm device adapted for mounting upon the one, and having a frictional releasing means for coacting with another of two structures between which there is relative movement, as, for instance two relatively sliding sash of a window; the mounting for the alarm comprising an attaching support adapted to be secured, for instance, upon the meeting rail of the window in approximately correct position, and an alarm carrier sliding upon said support to and from, and in the direction of impingement of the frictional releasing device against, the other relatively movable member, for instance, the window pane; a locking device being also provided for fixing the carrier in any position to which it may be adjusted upon the support.

The present invention seeks to provide an improved construction of support adapted to serve the purposes of my previous invention aforesaid.

The invention will be more fully understood upon reference to the accompanying drawings, in which—

Figures 1, 2, and 3 are, respectively, a side elevation of a complete alarm device, a front elevation of the same, and a longitudinal sectional view of the mounting.

A represents the mounting; B the alarm; and C the releasing device. The mounting comprises the attaching base $A^1$ and the carrier $A^2$, the former provided with a slide track $A^3$ and the latter with a slide shoe $A^4$ mounted thereon and engaged therewith in a manner to resist vertical or lateral displacement while permitting longitudinal sliding movement. The mounting further comprises a friction tongue $A^5$ pivoted at $A^6$ upon the attaching base $A^1$, and in position to develop frictional pressure against the under side of the shoe $A^4$ of the carrier $A^2$; also a presser-foot $A^7$ pivoted at $A^8$ upon the attaching base in position to force the friction tongue against the slide shoe and so retain the carrier in any position to which it may be adjusted upon the attaching base, said presser-foot having a controlling finger-piece $A^9$ at such angular position thereon as will arrest the presser-foot $A^7$ when it has swung upwardly slightly beyond its dead center position, and where it will be held by the pressure of the friction tongue $A^5$. The friction tongue is deflected intermediate of its length so that when forced into contact with the slide shoe it is put under tension. The parts may assume the positions indicated at $A^{5'}$, $A^{9'}$ to permit assembly of the mounting, or the friction tongue may be moved to the position $A^{5''}$ with the carrier removed from the attaching base in order to permit the screw $A^{10}$ to be introduced in mounting the attaching base upon the building structure to which the alarm is to be applied.

The attaching base $A'$ is U-shaped or channel formed in cross section. Its bottom web serves for attachment to the building structure; its upstanding sides provide side walls of a housing for the friction tongue $A^5$ and presser-foot $A^7$, and afford spaced bearings to confine the same to their duty, while their upper edges provide the slide tracks for the carrier. The carrier bridges the channel to provide the top wall of the housing and presents its slide shoe $A^4$ in position to receive the friction tongue.

The alarm may be of any suitable construction, such, for instance, as one embodying a bell $B^1$, a shell $B^2$ containing actuating mechanism for the bell, and an alarm stop $B^3$ protruding from the alarm and operating in the well-known manner to arrest the alarm when forced inwardly and release the alarm when permitted to move outwardly.

While adapted for many different uses, the functioning of the improved mounting, and particularly its feature of accurate adjustability will be appreciated from its illustrated use in the present instance in connection with the particular form of releasing device employed in connection with the alarm device B.

This releasing device comprises an arm C, pivoted at $C^1$ and carrying projections $C^2$, $C^3$ at its respective ends, either of which by swinging of the arm C, may be brought into position to depress the alarm stop B³. The projection C² is provided with a friction pad C⁴ through which the arm C may rest in frictional contact with the surface relative to which the alarm moves in the opening of the closure to be protected, for instance, the glass or other surface of one of two window sash upon the rail of the other of which the alarm is mounted, and so that relative movement between the two sliding members, when the alarm is properly applied, will cause the arm C to swing upon its pivot C¹ and so release the stop B³ and permit the alarm to sound.

The alarm is applied by attaching the base A¹, through the medium of the screw A¹⁰, for instance, to the top rail X of a lower window sash in approximate position which will bring the friction pad C⁴ against the window pane Y, for instance, the base A¹ being positioned so that its track A³ will be directed toward the surface with which the releasing pad C⁴ is to contact. The carrier A², with the alarm mounted thereon, is then applied to the track A³ and slid forward until proper frictional contact is developed between the pad C⁴ and the surface, when the finger-piece A⁹ is depressed to secure the parts in position.

I claim:

1. In an alarm device, the combination of an attaching base having upstanding side walls providing a slide track, an alarm carrier having a slide shoe bridging the channel of the attaching base and embracing and sliding upon said track, a friction tongue mounted between said side walls in position to enter into frictional bearing against said slide shoe, and means for pressing said tongue into said frictional bearing.

2. In an alarm device, the combination of an attaching base having upstanding side walls providing a slide track, an alarm carrier having a slide shoe bridging the channel of the attaching base and embracing and sliding upon said track, a friction tongue mounted between said side walls in position to enter into frictional bearing against said slide shoe, and means for pressing said tongue into said frictional bearing, comprising a presser-foot pivotally confined between said side walls in position to control said tongue.

3. In an alarm device, a channel formed attaching base having a bottom web and upstanding side walls spaced by said bottom web and having their upper edges constructed to form a slide track, a carrier constructed to embrace and slide upon said track and to bridge the space between said side walls, a friction tongue extending longitudinally in the channel of said base and supported by said side walls in position to bear against the under side of the carrier, and a presser-foot movably confined between said side walls in position to engage said friction tongue.

4. In an alarm device, a channel formed attaching base having a bottom web and upstanding side walls spaced by said bottom web and having their upper edges constructed to form a slide track, a carrier constructed to embrace and slide upon said track and to bridge the space between said side walls, a friction tongue extending longitudinally in the channel of said base and supported by said side walls in position to bear against the under side of the carrier, and a presser-foot pivotally confined between said side walls in position to engage said friction tongue, and having a finger piece presented for manipulation at the end of the channel of the base.

5. In an alarm device, the combination of an attaching member comprising a base and an upstanding wall carrying a slide track extending longitudinally thereof, an alarm, an alarm carrier engaging said slide track and sliding thereon to position the alarm, and means for arresting the alarm carrier in different positions upon its track comprising a tongue pivotally mounted at a fixed point upon the attaching member and having a contacting portion swinging parallel with the upstanding wall into frictional engagement with the carrier, and means for holding said tongue against the carrier.

Signed at Chicago, Illinois, this 29th day of August, 1919.

JAMES M. BUTCHER.